United States Patent
Fluch et al.

(10) Patent No.: US 11,292,028 B2
(45) Date of Patent: Apr. 5, 2022

(54) PROCESS FOR MANUFACTURING LACQUER-COATED ELECTRIC SHEET STRIP, AND LACQUER-COATED ELECTRIC SHEET STRIP

(71) Applicant: voestalpine Stahl GmbH, Linz (AT)

(72) Inventors: Ronald Fluch, Linz (AT); Timothy Keppert, Linz (AT)

(73) Assignee: VOESTALPINE STAHL Gmbh, Linz (AT)

( * ) Notice: Subject to any disclaimer, the term of this patent is extended or adjusted under 35 U.S.C. 154(b) by 0 days.

(21) Appl. No.: 16/494,589

(22) PCT Filed: Mar. 16, 2018

(86) PCT No.: PCT/EP2018/056734
§ 371 (c)(1),
(2) Date: Sep. 16, 2019

(87) PCT Pub. No.: WO2018/167296
PCT Pub. Date: Sep. 20, 2018

(65) Prior Publication Data
US 2020/0086343 A1    Mar. 19, 2020

(30) Foreign Application Priority Data
Mar. 17, 2017    (DE) .................. 10 2017 204 522.1

(51) Int. Cl.
*B05D 5/12*    (2006.01)
*B05D 3/02*    (2006.01)
(Continued)

(52) U.S. Cl.
CPC ............. *B05D 5/12* (2013.01); *B05D 3/0272* (2013.01); *B05D 5/10* (2013.01); *B05D 7/542* (2013.01);
(Continued)

(58) Field of Classification Search
CPC .............. H01F 1/18; B05D 5/12; B05D 7/542
See application file for complete search history.

(56) References Cited

U.S. PATENT DOCUMENTS

2007/0087201 A1    4/2007   Wimmer et al.
2012/0305140 A1*   12/2012  Yamazaki ............... C21D 1/26
                                                    148/253
(Continued)

FOREIGN PATENT DOCUMENTS

DE    32 44 823 A1    6/1984
EP    3 060 061 A1    8/2016
(Continued)

OTHER PUBLICATIONS

International Search Report dated Jun. 26, 2018, from International Patent Application No. PCT/EP2018/056734, 7 pages.
(Continued)

*Primary Examiner* — Austin Murata
(74) *Attorney, Agent, or Firm* — Staas & Halsey LLP (57) ABSTRACT

In a process for producing a lacquer-coated electric sheet strip a first insulation lacquer layer is applied wet across at least one side of an electric sheet strip. Across the wet first insulation lacquer layer a wet second insulation lacquer layer is applied. In a drying oven drying of the first insulation lacquer layer and the second insulation lacquer layer is performed.

14 Claims, 3 Drawing Sheets

(51) Int. Cl.
B05D 5/10 (2006.01)
B05D 7/00 (2006.01)
H01F 1/18 (2006.01)

(52) U.S. Cl.
CPC ........... *H01F 1/18* (2013.01); *B05D 2252/02* (2013.01); *B05D 2252/10* (2013.01); *B05D 2504/00* (2013.01)

(56) References Cited

U.S. PATENT DOCUMENTS

| | | | | |
|---|---|---|---|---|
| 2015/0368158 | A1* | 12/2015 | Lema Tre | C23C 22/18 428/312.6 |
| 2018/0247763 | A1* | 8/2018 | Schatzl-Linder | H01F 41/043 |
| 2020/0126698 | A1* | 4/2020 | Takebayashi | C23C 28/042 |
| 2020/0208235 | A1* | 7/2020 | Yamamoto | C23C 22/03 |

FOREIGN PATENT DOCUMENTS

| | | |
|---|---|---|
| JP | 63-35746 A | 2/1988 |
| JP | 2016-29205 A | 3/2016 |

OTHER PUBLICATIONS

Written Opinion of the International Searching Authority dated Jun. 26, 2018, from International Patent Application No. PCT/EP2018/056734, 7 pages.
German Office Action dated Nov. 16, 2017 from German Patent Application No. 10 2017 204 522.1, 5 pages.
Office Action dated Dec. 7, 2021, in Japanese Application No. 2019-548878 (3 pages).

* cited by examiner

PROCESS FOR MANUFACTURING LACQUER-COATED ELECTRIC SHEET STRIP, AND LACQUER-COATED ELECTRIC SHEET STRIP

CROSS REFERENCE TO RELATED APPLICATIONS

This application is a U.S. national stage of International Application No. PCT/EP2018/056734, filed on Mar. 16, 2018. The International Application claims the priority benefit of German Application No. 10 2017 204 522.1 filed on Mar. 17, 2017. Both the International Application and the German Application are incorporated by reference herein in their entirety.

BACKGROUND

The invention relates to a process for producing a lacquer-coated electric sheet strip and to a lacquer-coated electric sheet strip.

Electric sheets are used in the electrical engineering industry in the construction of generators, electric motors, transformers and other electrical machines. As required, electric sheets made of different steel alloys and with different soft-magnetic properties, power losses, thicknesses and other properties that are important according to the field of use are chosen.

Electric sheets or laminations are produced from an electric sheet strip (frequently also referred to in industry as electric strip) by cutting it to length and to size. The electric sheets constitute the starting material for magnetic cores (called electric cores) of the electrical machines in which they are used. The electric cores are built up from layered electric sheets that are electrically insulated from one another. For this purpose, electrically insulated electric sheets are converted to their final form by punching or cutting, stacked to form an electric core (lamination stack) and then bonded to one another (baking). By virtue of the layer structure, the occurrence of eddy currents in the electric core is largely suppressed, which distinctly increases the efficiency of the electric core.

It is already known that the electric sheets can be coated with an adhesive insulation lacquer or paint layer that enables bonding of the electric sheets in the lamination stack and also brings about electrical insulation between the electric sheets. In order to assure sufficient certainty of electrical insulation over the lifetime of the electric core, the adhesive insulation lacquer layer, however, must have a certain minimum thickness. On the other hand, an increase in the layer thickness of the insulation lacquer layer, which is advantageous from an insulation point of view, will lead to a deterioration in the stacking factor, which should be as large as possible for the achievement of a high efficiency. Moreover, an excessively high layer thickness of the insulation lacquer layer may lead to inadequate long-term dimensional stability of an electric core in operation (i.e. the failing of the settling test).

Document US 2012/0064316 A1 already discloses coating a continuous metal substrate with an anticorrosion layer consisting of a lower layer, an upper layer and a diffusion layer that occurs between the two layers. The upper layer is applied here across the still-wet lower layer, by means of which the diffusion layer between the two layers can form.

SUMMARY

One objective underlying the invention can be considered that of specifying a process for producing a lacquer-coated electric sheet strip that enables simple and inexpensive production of an electric sheet strip suitable for the construction of high-performance and long-lived electric cores. A further aim of the invention is that of providing an electric sheet strip having the properties specified.

The objective is achieved by the features of the independent claims. Embodiments and developments are the subject of the dependent claims.

Accordingly, a process for producing a lacquer-coated electric sheet strip comprises the wet application of a first (electrical) insulation lacquer layer across at least one side of the electric sheet strip, the wet application of a second (electrical) insulation lacquer layer across the wet first insulation lacquer layer by roll application, and the drying of the first insulation lacquer layer and the second insulation lacquer layer in a drying oven.

Firstly, embodiments of the invention are based on the concept of implementing a multilayer construction in the (continuous) electric sheet strip. The multilayer construction enables controlled coating of the electric sheet strip with a first insulation lacquer layer optimized for electrical insulation and an adhesive second insulation lacquer layer optimized for the later bonding of the electric sheets.

Embodiments of the invention are also based on the concept of undertaking wet application of the second insulation lacquer layer across the still-wet first insulation lacquer layer (called wet-on-wet application) and the drying of the layers applied in a common drying process. The wet-on-wet application of the second insulation lacquer layer across the first insulation lacquer layer and the subsequent combined drying of the two layers enables particularly economically viable production of the lacquer-coated electric sheet strip.

The production of the multilayer system can be conducted in a (single) inline process. More particularly, it has been recognized that the wet-on-wet application of the two layers is possible even in the case of relatively low layer thicknesses without impairing the bonding properties of the upper second insulation lacquer layer.

In other words, it is possible to achieve application of the upper second insulation lacquer layer by a roll application—i.e. a non-contactless application method—and nevertheless retention of its full function. Roll application is a particularly cost-effective application method.

In one embodiment, the wet application of the first insulation lacquer layer, the wet application of the second insulation lacquer layer and the drying of the first insulation lacquer layer and the second insulation lacquer layer (and optionally further layers) can be effected in a continuous belt run, i.e., for example, in the same belt coating system and/or without intermediate winding onto a coil and/or without cutting-to-length. In this case, the individual process steps (wet-on-wet application and drying) can be conducted in immediate proximity in terms of space and time. More particularly, the multilayer construction can be conducted without intermediate drying of the previously applied layers (in the case of a two-layer construction, without drying of the first insulation lacquer layer prior to the wet application of the second insulation lacquer layer).

For example, a duration between the wet application of the first insulation lacquer layer and the wet application of the second insulation lacquer layer may be not more than 20 s, especially 15 s, 10 s or 5 s.

The coated electric sheet strip can likewise be dried in quick succession after the wet-on-wet coating. For example, a duration between the wet application of the second insulation lacquer layer and the commencement of drying may be not more than 20 s, especially 15 s, 10 s or 5 s.

The maximum lamination temperature in the drying oven may, for example, be between 150° C. and 280° C., especially between 170° C., 180° C., 190° C. or 200° C. as the lower temperature limit and/or, for example, 250° C., 220° C., 210° C. or 200° C. as the upper temperature limit. This can achieve sufficient consolidation of the layers, such that they do not remain stuck, for example, to the belt running rolls beyond the drying oven (e.g. continuous drying oven). On the other hand, temperatures that are not excessively high enable the second insulation lacquer layer to retain its function in respect of the later bonding process in the layered electrical core.

For example, it is possible to achieve low layer thicknesses between 1 μm and 12 μm, especially between 4 μm and 10 μm and/or not less than 6 μm, 8 μm or 10 μm of the dried first insulation lacquer layer and/or of the dried second insulation lacquer layer. The lower the layer thickness, the greater the stacking factor of the electrical core can be and the more favorable the prerequisites that exist for the passing of the settling test.

A minor degree of influence on the properties of the second insulation lacquer layer by the underlying layer (e.g. first insulation lacquer layer) can be promoted, for example, in that the viscosity of the first insulation lacquer layer directly after its wet application is greater than the viscosity of the second insulation lacquer layer directly after its wet application.

The wet application of the first insulation lacquer layer can likewise be effected by roll application. Roll application enables cost-effective layer application with a good adjustability of layer thickness.

The roll for the wet application of the second insulation lacquer layer can rotate in belt running direction, which enables gentle application of the second insulation lacquer across the (wet) first insulation lacquer layer beneath. More particularly, the roll speed may be higher than the belt speed, which can achieve very low shear consolidation of the second insulation lacquer layer and/or a minor degree of mechanical influence on the first insulation lacquer layer beneath on the part of the roll.

A lacquer-coated electric sheet strip comprises an electric sheet strip, a dry first insulation lacquer layer across at least one side of the electric sheet strip and a dry second insulation lacquer layer across the dry first insulation lacquer layer, which has been applied wet across the still-wet first insulation lacquer layer and then dried together with the wet first insulation lacquer layer. Such a lacquer-coated electric sheet strip has high electrical insulation properties and good bondability in the later process for production of the electrical core. It can also be produced inexpensively and with low layer thicknesses.

The dry first insulation lacquer layer may be a formaldehyde-free lacquer layer, especially a formaldehyde-free C6 lacquer layer.

The dry second insulation lacquer layer may be an epoxy resin-based layer and/or a baking lacquer layer, especially an epoxy resin-based baking lacquer layer.

The lacquer-coated electric sheet strip may have been coated on one or both sides. For example, the lacquer-coated electric sheet strip may have, across the side opposite the coated side, a further dry first insulation lacquer layer and a further dry second insulation lacquer layer across the further dry first insulation lacquer layer, where the further dry second insulation lacquer layer has been applied wet across the still-wet further first insulation lacquer layer and then dried together with the wet further first insulation lacquer layer.

The lacquer-coated electric sheet strip may (after drying) be wound up to give a coil (winding). The coil may, for example, be transported to a customer, for example, and cut to length and size there into individual electric sheets. Another option is to undertake the cutting-to-length at an earlier stage, in the continuous belt run after the drying, and then to transport the individual electric sheets to their intended site (for example to the customer) and cut them to size there.

There follows an illustrative elucidation of embodiments and developments with reference to the schematic drawings, although some of the drawings use a different degree of detail. The drawings are not true to scale. Identical reference numerals refer to the same or similar parts.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Reference will now be made in detail to examples which are illustrated in the accompanying drawings, wherein like reference numerals refer to like elements throughout.

Terms such as "applying" and similar terms (e.g. "applied") should not be considered in this description to mean that the layers applied must be in direct contact with the surface to which they are applied. It is possible for intervening layers to be present between the layers "applied" and the underlying surface. However, the abovementioned or similar terms in this disclosure may also have the specific meaning that the layers are in direct contact with the underlying surface, meaning that no intervening layers are present.

The term "across" which is used in relation to an element or a material layer which is formed or positioned "across" a surface can be used here in such a meaning that the element or the material layer is placed "indirectly on" the surface, where intervening elements or layers may be present between the surface and the element or the material layer. However, the term "across" may also have the specific meaning that the element or material layer which is applied "across" a surface is placed "directly on", i.e., for example, in direct contact with, the surface in question. The same applies analogously to similar terms such as "above", "below", "beneath", etc.

Figure 1:
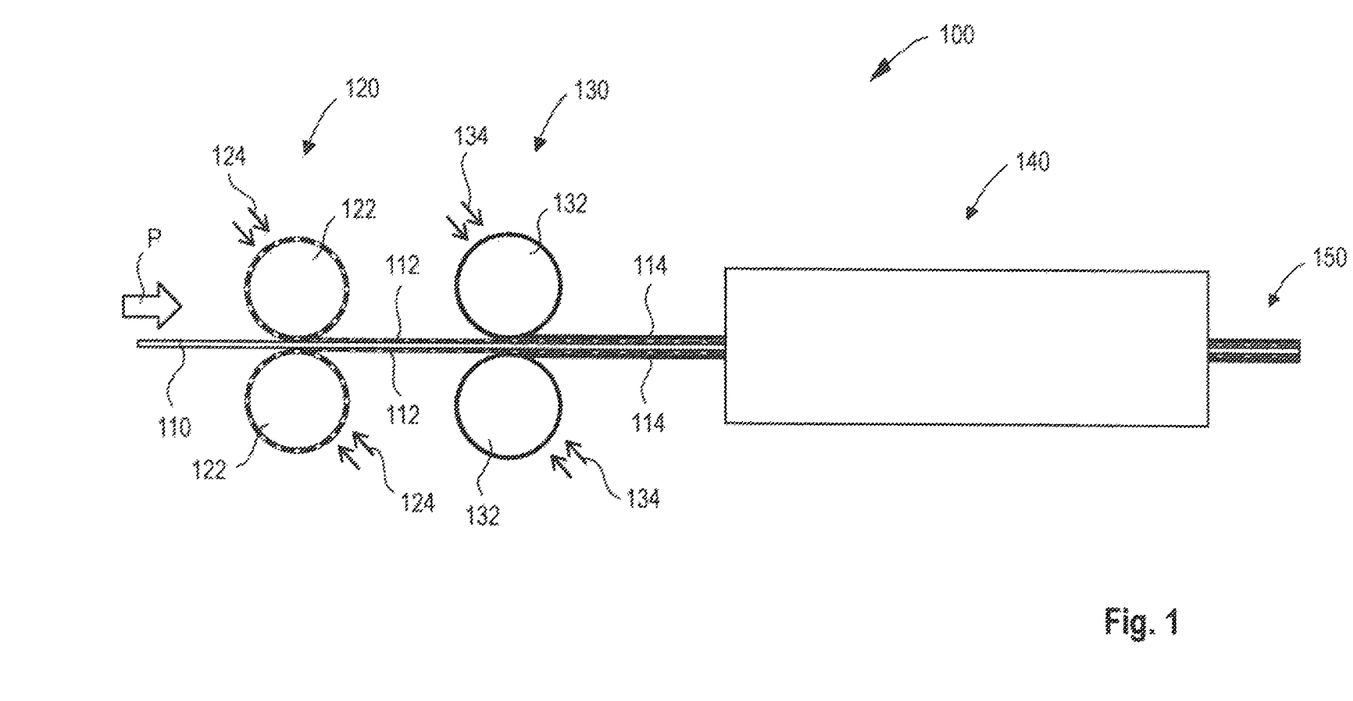
FIG. 1 shows, in longitudinal section view, an illustrative process for applying a first (electrical) insulation lacquer layer and a second insulation lacquer layer to an electric sheet strip and drying of the layers in a drying oven.

FIG. 1 illustrates an illustrative belt run of an electric sheet strip 110 in a belt coating system 100. An electric sheet strip 110 is supplied to the belt coating system 100 in a continuous belt run (see arrow P). The electric sheet strip 110 may, for example, be a cold-rolled, non-grain-oriented electrical steel sheet in the finally annealed state (e.g. DIN EN 10106). Other electric sheets, for example electric sheets that have not been finally annealed etc., are likewise possible. Cold-rolled or hot-rolled electric sheets are used, for example, as pole laminations in exciters or generators.

The electric sheet strip 110 supplied to the belt coating system 100 may take the form, for example, of a "continuous" metal strip, which is optionally unwound from a coil (not shown) in arrow direction P.

The belt coating system 100 comprises at least one first coating station 120, a second coating station 130 and a drying oven 140, for example a drying/baking oven.

The coating system 100, in the example shown here, is illustrated as a double-sided coating system 100. However, it is also possible that just one side of the electric sheet strip 110 (for example the top side shown in FIG. 1) is coated and dried. In that respect, all remarks hereinafter are applicable both in the case of a single-sided coating and for the option shown of coating the electric sheet strip 110 on both sides. In the second case (double-sided coating), all statements made with regard to the coating and drying may be applicable both to the processing of the top side of the strip and to the processing of the opposite underside of the electric sheet strip 110. In addition, it is also possible to undertake double-sided coating with different layers on the two sides of the strip, as addressed hereinafter.

The electric sheet strip 110 in the uncoated state or optionally already precoated by a primer (not shown) is coated in the first coating station 120 with a wet first insulation lacquer layer 112. The coating may be over the full area, i.e. completely cover the surface of the electric sheet strip 110.

The wet first insulation lacquer layer 112 may be applied by a roll or drum 122 (or a pair of rolls or drums 122) to the upper flat side (or else to the opposite lower flat side) of the electric sheet strip 110. In the case of roll application of the wet first insulation lacquer layer 112, the roll 122 runs against the moving electric sheet strip 110 and as it does so deposits liquid insulation lacquer 124 that has been applied to the roll 122 beforehand on the surface of the electric sheet strip 110. It is possible here to adjust both the layer thickness and the viscosity of the first insulation lacquer layer 112 by means of the parameters of the roll application.

After the application of the (wet) first insulation lacquer layer 112 to one or both sides of the electric sheet strip 110, the wet-coated electric sheet strip 110 runs through the second coating station 130. In the second coating station 130, by means of a roll 132 (or a pair of rolls 132), a wet second insulation lacquer layer is applied to the wet first insulation lacquer layer 112. The application is effected by roll application, where the viscosity of the (wet) second insulation lacquer layer 114 and its layer thickness (measured after drying) are again adjustable via roll application parameters. This coating too may be over the full area, i.e. completely cover the surface of the wet first insulation lacquer layer 112.

In the case of different coating on the two sides, it is possible, for example, to apply solely the first insulation lacquer layer 112 or solely the second insulation lacquer layer 114 on the underside of the electric sheet strip 110. It is thus possible, for example, for just one of the two rolls to be designed for application of lacquer either in the case of roll pair 122 or in the case of roll pair 132.

The second insulation lacquer 134 is an adhesive insulation lacquer, for example an adhesive lacquer. The second insulation lacquer 134 is fed to the roll 132 via a suitable feed system (not shown in detail). For example, the same amount of second insulation lacquer 134 that is deposited on the electric sheet strip 110 for formation of the wet second insulation lacquer layer 114 may be supplied to the roll 132 as fresh lacquer (e.g. adhesive lacquer).

There is no (significant) intermediate drying of the electric sheet strip 110 coated with the wet first insulation lacquer layer 112 between the first coating station 120 and the second coating station 130. This means that the first insulation lacquer layer 112 is still wet on entry into the second coating station 130 and on application of the second insulation lacquer 134. For example, the coating system 100 does not have any drying unit (e.g. oven, irradiation unit, etc.) between the first coating station 120 and the second coating station 130 that would bring about partial and/or complete drying of the first insulation lacquer layer 112.

The first coating station 120 and the second coating station 130 may be arranged close to one another in space and—based on the belt running speed—in time. For example, it may be the case that the spatial distance between the first coating station 120 and the second coating station 130 (i.e., for example, the distance between the axes of the rolls 122 and 132) is not more than 10 m, 8 m, 6 m, 5 m or 4 m. The period of time between the wet application of the first insulation lacquer layer 112 in the first coating station 120 and the application of the wet second insulation lacquer layer 114 in the second coating station 130 may be not more than 20 s, 15 s, 10 s, 5 s or 3 s. Typical belt running speeds may, for example, be in the region of 100 m/min, where this value may vary, for example, by ±10%, ±20%, ±30%, ±40% or ±50%.

The second insulation lacquer 134 may be applied over the full area or else only over part of the area of the (wet) first insulation lacquer layer 112 since electrical insulation can already be assured thereby. For example, a second insulation lacquer layer 114 can be produced with a degree of coverage of not more than 80%, 60%, 40% or 20% of the area of the underlayer (first insulation lacquer layer 112 or flat side of the electric sheet strip 110). For example, the second insulation lacquer layer 114 may be applied as a striped pattern in which lacquer layer stripes alternate with uncoated stripe areas. The first insulation lacquer layer 112 is preferably applied over the full area of the electric sheet strip 110, but application over only part of the area is optionally possible for this layer as well, in which case the uncovered (omitted) areas must be covered by the second insulation lacquer layer 114.

The drying oven 140 is beyond the second coating station 130 as the belt runs. The distance in time and space between the second coating station 130 and the entry into the drying oven 140 may have, for example, the same values as specified above for the distance in time and space between the first coating station 120 and the second coating station 130.

In the drying oven 140, there is joint drying of the first insulation lacquer layer 112 and the second insulation lacquer layer 114. For this purpose, the drying oven 140 may be designed as a continuous drying oven through which the coated electric sheet strip 110 runs continuously. For example, the maximum temperature of the electric sheet strip 110 in the drying oven 140 may be between 150° C. and 280° C., where particularly temperature values of not less than 170° C., 180° C., 190° C., 200° C., 210° C., 220° C. or 230° C. and/or not more than 250° C., 220° C., 210° C., 200° C. or 190° C. may be provided. The heat treatment in the drying oven 140 may, for example, be between 10 s and 40 s and especially less, equal to or greater than 20 s or 30 s. Other temperatures and durations of heat treatment are likewise possible. The optimal temperatures and durations of heat treatment may depend on which materials are used for the first insulation lacquer 124 and for the second, adhesive insulation lacquer 134.

In the drying oven 140, the first insulation lacquer layer 112 and the second insulation lacquer layer 114 are each dried by crosslinking, for example, at least to such an extent that these layers are mechanically stable and bonded in an abrasion-resistant manner to the electric sheet strip 110 at the outlet end of the drying oven 140 as the belt runs. This then enables the further handling of the dried, coated electric sheet strip 150 as the belt runs beyond the drying oven 140, for example by means of deflecting rolls or by winding to form a coil (not shown in FIG. 1).

The first insulation lacquer 124 and the second insulation lacquer 134 are different lacquers or materials. The first insulation lacquer 124 may have a higher electrical insulation effect (breakdown voltage) and/or a higher mechanical dimensional stability in the dry layer state than the second insulation lacquer 134. The adhesive second insulation lacquer 134 may, by comparison, have a higher bondability or bonding force in the later bonding process (baking process) in the electrical core than the first insulation lacquer 124—where the latter may even have no bondability in the dried state.

The first insulation lacquer 124 especially has high electrical insulation properties and high dimensional stability and general stability on later use in the electric core. The first insulation lacquer 124 used may, for example, be a formaldehyde-free lacquer. It has been found that a formaldehyde-free lacquer has particularly good compatibility with the adhesive second insulation lacquer 134 applied subsequently, meaning that the insulation properties of the formaldehyde-free first insulation lacquer 124 and/or the bonding properties of the second insulation lacquer 134 are each affected to a minor degree by the other lacquer component, if at all.

Formaldehyde-free lacquer refers to a lacquer which does not release any formaldehyde when heated in the electrical core (i.e. in the operation of the electrical machine). This means that freedom from formaldehyde relates not only to the constituents of the liquid insulation lacquer (although this is likewise formaldehyde-free), but also to the reaction products formed in the operation of the electrical machine.

The first insulation lacquer 124 is in water-based form, for example, meaning that it has only a very low content of organic solvents, if any. In this respect, the wet first insulation lacquer layer 112 may also be in the form of a waterborne lacquer film on the electric sheet strip 110.

The first insulation lacquer 124 may, for example, be a C6 lacquer. More particularly, for example, it is possible to use the C6 lacquer Remisol EB500FF. "FF" here stands for formaldehyde-free (i.e. free of formaldehyde emissions). It is likewise possible to use, for example, a C5 lacquer.

The second insulation lacquer 134 used is a lacquer having good adhesive properties. The second insulation lacquer 134 may likewise be in water-based form, such that the wet second insulation lacquer layer 114 is applied to the wet first insulation lacquer layer 112 in the form of a further waterborne lacquer film.

For example, the second insulation lacquer 134 used may be what is called a baking lacquer. Baking lacquer layers are chemically curable, adhesive insulation lacquer layers that have been specially developed for electrical core construction and have high dimensional stability, operational stability and high bonding forces. For example, it is possible to use what is called a V baking lacquer that enables high bonding forces, a long duration of use owing to low aging, improved long-term characteristics and a short baking time under reduced pressure. Likewise usable as the second insulation lacquer 134 is, for example, a C6 lacquer.

The electric sheet strip 110 may, for example, be the electric sheet strip isovac 800-50A, although it is likewise possible to use a multitude of other electric sheet strips or isovac products.

It has been found here that the wet second insulation lacquer layer 114 is applicable to the wet first insulation lacquer layer 112 without contamination of the roll 132. This means that, in spite of the non-contactless application of the second insulation lacquer 134, there is only a very minor degree, if any, of contamination of the roll 132 by the already applied first insulation lacquer 124 in the first insulation lacquer layer 112. Otherwise, the roll 132 would take up some of the first insulation lacquer layer 112 and, after a certain time, would release not largely pure second insulation lacquer 134 but a mixture of first insulation lacquer 124 and second insulation lacquer 134. This would distinctly impair the properties of the multilayer system.

In the case of roll application, it is possible to adjust the viscosity of a water-thinning lacquer via what is called the shear rate. Water-thinning lacquers are shear-thinning, meaning that their viscosity changes as a function of shear rate. In the case of roll application, the (water-thinning) lacquer is sheared, such that the viscosity of the lacquer applied, i.e. of the first insulation lacquer layer 112 and the second insulation lacquer layer 114, can be adjusted via the shear rate.

In order to enable very gentle application of the second insulation lacquer 134 to the wet first insulation lacquer layer 112, the shear thinning of the second insulation lacquer 134 on roll application can be set as low as possible. For this purpose, the roll 132 in the second coating station 130 can be rotated in forward direction (i.e. belt running direction), and it can optionally be moved somewhat more quickly than the belt speed. This enables gentle application of the second insulation lacquer 134, which makes it possible to widely avoid mixing of the layers (wet first insulation lacquer layer 112 and wet second insulation lacquer layer 114). The higher the relative speed between the electric sheet strip 110 and the roll 132, the higher the shear on the lacquer on application.

If the first insulation lacquer 124 is likewise applied by a roll application, it is possible here too to adjust the viscosity of the first insulation lacquer layer 112 via the relative speed between the roll 122 and the electric sheet strip 110. The viscosity of the first insulation lacquer layer 112 may be set to a higher level, for example, than the viscosity of the second insulation lacquer layer 114.

Figure 2:
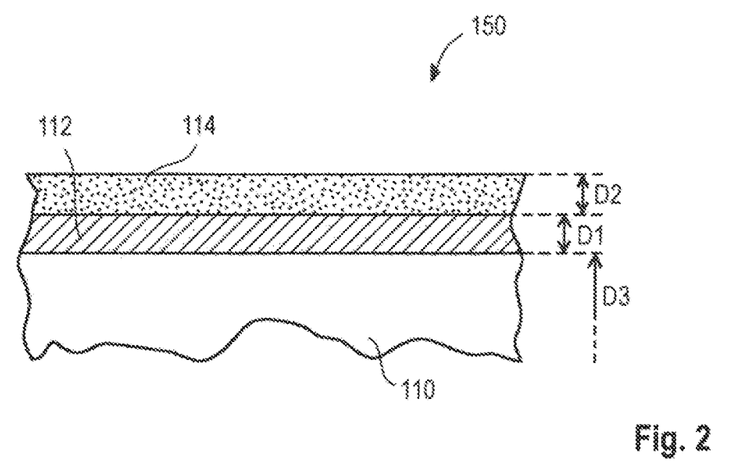
FIG. 2 shows, in longitudinal section view, by way of example, a near-surface detail from an electric sheet strip after layer drying, which has been coated with a wet first insulation lacquer layer and with a wet second insulation lacquer layer above it.

A further aspect relates to the adjustment of the layer thicknesses of the first insulation lacquer layer 112 and the second insulation lacquer layer 114. FIG. 2 shows, in longitudinal section view, in a simplified diagram, a near-surface detail from the coated electric sheet strip 110 in the region beyond the drying oven 140. Variations in layer thickness and/or the minimum of a mixing zone present between the layers are not shown. The cross-sectional view may be identical to the longitudinal section view shown.

The (dry) first insulation lacquer layer 112 has a thickness D1 and the (dry) second insulation lacquer layer 114 has a thickness D2. The layer thicknesses D1 and/or D2 may each be not less than 1 µm and, for example, in each case not less than or less than 2 µm, 3 µm, 4 µm, 5 µm, 6 µm, 7 µm, 8 µm, 9 µm, 10 µm, 11 µm or 12 µm. The sheet thickness D3 of the electric sheet strip 110 may, for example, be not more than 0.5 mm, 0.4 mm, 0.35 mm or 0.3 mm.

Microscope studies on coated electric sheet strips 150 have shown that the variations in layer thickness are small in practice, and that a layer boundary between the (dry) first insulation lacquer layer 112 and the (dry) second insulation lacquer layer 114 is achievable with a high degree of definition or sharpness (and is clearly visible). For example, a very thin mixed interfacial layer of thickness less than, for example, 10% or 5% of the layer thicknesses D1 or D2 is achievable.

In the setting of the layer thicknesses D1, D2, it has been found that, in the wet-on-wet coating, the thickness D2 of the second insulation lacquer layer 114 is independent of whether the bare surface of the electric sheet strip 110 or the wet first insulation lacquer layer 112 is being coated. This means that it is possible first to adjust the layer thickness D2 of the second insulation lacquer layer 114 on the bare sheet metal surface and then to "add in" the first coating with the first insulation lacquer layer 112.

Figure 3:
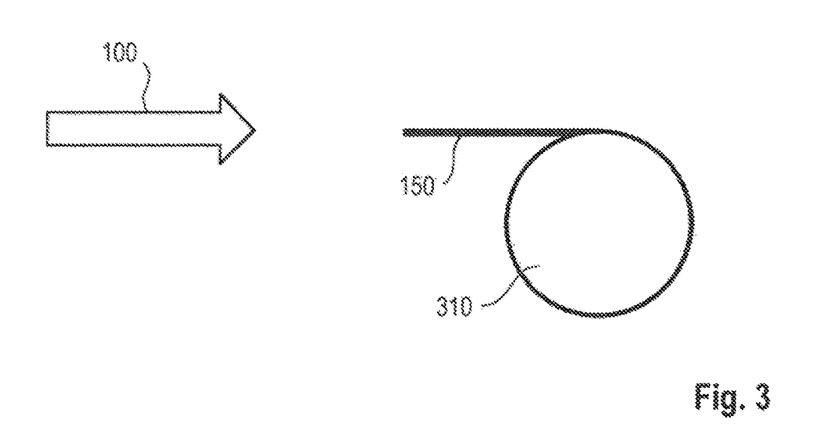
FIG. 3 shows a coil made from a lacquer-coated electric sheet strip in one embodiment of the invention.

FIG. 3 illustrates a coil (winding) 310 of the coated electric sheet strip 150, as can be produced at the outlet end of the belt coating system 100. It is pointed out that there is no need for any elastic deformation of the electric sheet strip 110 by roll deflection and/or winding-up throughout the belt coating system 100, meaning that the coating and drying processes can be conducted on the linear electric sheet strip 110; see FIG. 1. Since the electric sheet strips are very sensitive to elastic deformation in relation to their magnetic properties, the avoidance of deflecting and/or winding processes in the belt coating system 100 further promotes the production of a high-quality electric sheet strip.

Figure 4:
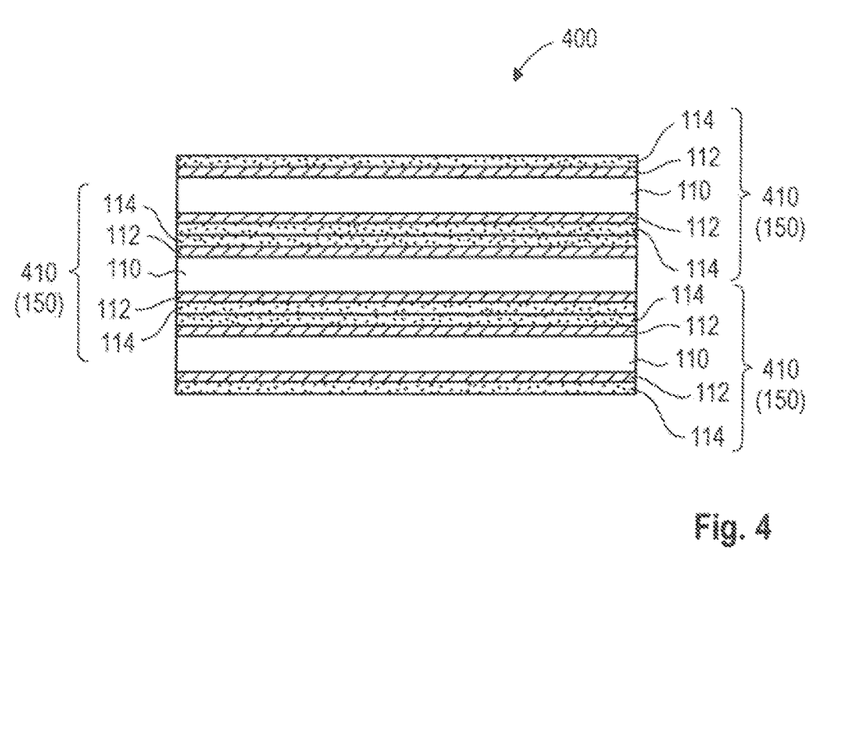
FIG. 4 shows an electric sheet stack constructed from coated electric sheets layered one on top of another.

FIG. 4 shows, in schematic view, a detail from an electrical core 400 implemented by stacking electric sheets 410 that are obtained by cutting the coated, dried electric sheet strip 150 to length.

Typically, the electric sheets 410, prior to stacking, are converted to their final shape by cutting to size, for example by punching or laser cutting.

The electric sheets 410 are then combined to form a lamination stack that forms the later electrical core 400 by stacking, which is typically conducted manually and constitutes the most costly aspect of the manufacture of the electrical core 400.

Subsequently, the lamination stack is consolidated by curing the (dried) second insulation lacquer layers 114. The consolidation mechanism is based on a chemical reaction, typically three-dimensional crosslinking of the adhesive of the second insulation lacquer layer 114. The curing (chemical crosslinking) of the adhesive can be effected by bracing the layered electric sheets 410 and heating the layer stack, for example in an oven.

The example presented here presents an electrical core 400 produced from a double-sidedly coated electric sheet 410. As already mentioned, it is also possible to use single-sidedly coated electric sheets 410 or differently double-sidedly coated electric sheets 410, by means of which higher stacking factors may be achievable. However, in the case of single-sided coating, the bonding force is lower and higher bonding temperatures are required in order to be able to assure the necessary integrity of the electrical core 400. In the case of different coatings on either side, it is likewise possible for lower bonding forces and/or possibly lower long-term properties to occur in relation to insulation reliabilities and/or dimensional stability.

Figure 5:
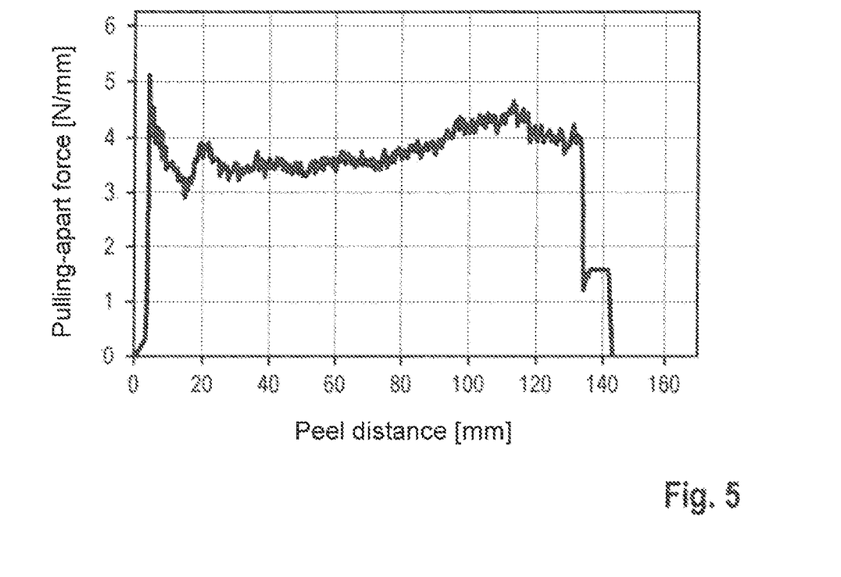
FIG. 5 illustrates, by way of example, the progression of the pulling-apart force (in N/mm) versus the peel distance (in mm) in the case of a sample consisting of two bonded electric sheet strips.

The diagram in FIG. 5 shows that the strength of the adhesive bond is not impaired by the wet-on-wet application of the second insulation lacquer layer 114 to the first insulation lacquer layer 112. What is shown is the force required to pull two electric sheets 410 in strip form apart again after they have been bonded. The pulling-apart force is normalized over the width of the strips, while the peel distance refers to the distance over which they have been pulled apart.

The experiments showed that pulling-apart forces comparable to the pulling-apart forces as required in a single-layer system, i.e. a pure second insulation lacquer layer corresponding to the second insulation lacquer layer 114 (without the first insulation lacquer layer 112 beneath), are required. This means that the bonding force of the second insulation lacquer layer 114 is weakened only to a very small degree, if at all, by the wet-on-wet application of the second insulation lacquer 134 ("adhesive lacquer") on the wet first insulation lacquer layer 112.

In this respect, it can be assumed that the product properties of the electrical core 400 after the baking process are comparable to the product properties of an electrical core in which the first insulation lacquer layer 112 is first applied and dried, then the second insulation lacquer layer 114 is applied to the dry first insulation lacquer layer 112 and dried again. However, such a process would necessitate a second, offline painting system and also require a second system pass through an annealing furnace, which would result in high additional expenditure and high costs. Furthermore, the electric sheet strip would be subject to elastic stress by requisite deflection or transport processes in an offline painting operation and hence its quality would be impaired. These disadvantages can be avoided in the embodiments described here.

It can be assumed that the results elucidated in FIG. 5 from an experiment constitute conclusions of general validity that are applicable to all the embodiments described in this disclosure.

The invention claimed is:

1. A process for producing a lacquer-coated electric sheet strip for a buildup of electric cores, comprising:
   wet application of a first insulation lacquer layer across at least one side of an electric sheet strip;
   without performing a partial or complete drying of the first insulation lacquer layer, wet application of a second insulation lacquer layer across the wet first insulation lacquer layer by roll application, where the first insulation lacquer layer and the second insulation lacquer layer are different lacquers; and
   drying of the first insulation lacquer layer and the second insulation lacquer layer in a drying oven.

2. The process as claimed in claim 1, wherein the wet application of the first insulation lacquer layer, the wet application of the second insulation lacquer layer and the drying of the first insulation lacquer layer and the second insulation lacquer layer are conducted in a continuous belt run.

3. The process as claimed in claim 2, wherein a duration between the wet application of the first insulation lacquer layer and the wet application of the second insulation lacquer layer is not more than 20 seconds.

4. The process as claimed in claim 2, wherein a duration between the wet application of the second insulation lacquer layer and the drying is not more than 20 seconds.

5. The process as claimed in any of claim 2, wherein a maximum lamination temperature in the drying oven is between 150° C. and 280° C.

6. The process as claimed in claim 1, wherein the second insulation lacquer layer is a layer that is an adhesive after the drying.

7. The process as claimed in claim 6, wherein the second insulation lacquer layer is a baking lacquer layer.

8. The process as claimed in claim 1, wherein a layer hickness of the first insulation lacquer layer after drying is between 1 and 12 micrometers.

9. The process as claimed in claim 1, wherein a layer thickness of the second insulation lacquer layer after drying is between 1 and 12 micrometers.

10. The process as claimed in claim 1, wherein a viscosity of the first insulation lacquer layer directly after the wet application of the first insulation lacquer layer is greater than a viscosity of the second insulation lacquer layer directly after the wet application of the second insulation lacquer layer.

11. The process as claimed claim 1, wherein the wet application of the first insulation lacquer layer is effected by roll application.

12. The process as claimed in claim 1, wherein the roll application for the wet application of the second insulation lacquer layer includes a roll which rotates in a belt running direction and which has a roll speed higher than a belt speed of the belt.

13. The process as claimed in claim 1, wherein a degree of coverage of the second insulation lacquer layer is not more than 80% of an area of the electric sheet strip.

14. A process for producing a lacquer-coated electric sheet strip for a buildup of electric cores, comprising:

wet application of a first insulation lacquer layer across at least one side of an electric sheet strip;

wet application of a second insulation lacquer layer across the wet first insulation lacquer layer by roll application, where the first insulation lacquer layer and the second insulation lacquer layer are different lacquers;

drying of the first insulation lacquer layer and the second insulation lacquer layer in a drying oven;

cutting the electric sheet strip so as to obtain a plurality of electric sheets; and stacking the plurality of electric sheets to form an electric core.

\* \* \* \* \*

UNITED STATES PATENT AND TRADEMARK OFFICE
CERTIFICATE OF CORRECTION

PATENT NO. : 11,292,028 B2
APPLICATION NO. : 16/494589
DATED : April 5, 2022
INVENTOR(S) : Ronald Fluch et al.

Page 1 of 1

It is certified that error appears in the above-identified patent and that said Letters Patent is hereby corrected as shown below:

In the Claims

Column 11, Line 13:
In Claim 8, delete "hickness" and insert --thickness--.

Column 11, Line 23:
In Claim 11, after "as claimed" insert --in--.

Signed and Sealed this
Thirty-first Day of May, 2022

Katherine Kelly Vidal
*Director of the United States Patent and Trademark Office*